United States Patent
Krutak, Sr. et al.

[11] Patent Number: 6,036,885
[45] Date of Patent: Mar. 14, 2000

[54] METHOD FOR MAKING CELLULOSE ESTERS INCORPORATING NEAR-INFRARED FLUOROPHORES

[75] Inventors: James John Krutak, Sr.; Thomas Vernon McCray; Edwin Taylor Boyd; Fred Dewey Barlow, Jr.; Melvin Glenn Mitchell; Lee Reynolds Partin, all of Kingsport, Tenn.

[73] Assignee: Eastman Chemical Company, Kingsport, Tenn.

[21] Appl. No.: 09/153,742

[22] Filed: Sep. 15, 1998

[51] Int. Cl.[7] .................................. C09K 11/02; D06P 3/60
[52] U.S. Cl. .............................. 252/301.34; 106/170.1; 106/161.01; 106/171.1; 8/518; 8/519; 8/528; 8/648; 8/661
[58] Field of Search ............... 252/301.34; 106/170.1, 106/168.01, 171.1; 8/518, 519, 528, 527, 648, 661

[56] References Cited

U.S. PATENT DOCUMENTS

| | | | |
|---|---|---|---|
| 3,759,947 | 9/1973 | Pugin et al. | 8/661 |
| 4,504,084 | 3/1985 | Jauch | 283/94 |
| 4,992,204 | 2/1991 | Kluger et al. | 252/301.16 |
| 5,123,999 | 6/1992 | Honnorat et al. | 162/140 |
| 5,292,855 | 3/1994 | Krutak et al. | 528/289 |
| 5,298,584 | 3/1994 | Blanchard et al. | 527/300 |
| 5,336,714 | 8/1994 | Krutak et al. | 524/608 |
| 5,397,819 | 3/1995 | Krutak et al. | 524/88 |
| 5,423,432 | 6/1995 | Krutak et al. | 209/577 |
| 5,461,136 | 10/1995 | Krutak et al. | 528/289 |
| 5,525,516 | 6/1996 | Krutak et al. | 436/56 |
| 5,553,714 | 9/1996 | Cushman et al. | 209/577 |
| 5,555,508 | 9/1996 | Mitchell et al. | 264/138 |
| 5,614,008 | 3/1997 | Escano et al. | 106/23 |
| 5,662,773 | 9/1997 | Frederick et al. | 162/4 |
| 5,665,151 | 9/1997 | Escano et al. | 106/31.15 |
| 5,703,229 | 12/1997 | Krutak et al. | 540/140 |

FOREIGN PATENT DOCUMENTS

| | | |
|---|---|---|
| 55-122100 | 9/1980 | Japan . |
| 64-30788 | 2/1989 | Japan . |
| 2-293500 | 12/1990 | Japan . |
| 5-98599 | 4/1993 | Japan . |
| 7-196782 | 8/1995 | Japan . |

*Primary Examiner*—C. Melissa Koslow
*Attorney, Agent, or Firm*—Bernard J. Graves; Harry J. Gwinnell

[57] ABSTRACT

A cellulosic ester has associated with the ester at least one near infrared fluorophore. A method for incorporating the near infred fluorophore into the cellulosic ester is also provided. In the method, the near infrared fluorophore is dissolved in a strong acid and precipitated to form an acid paste. The paste is then added to an activated cellulose, such as a hydrolyzed cellulose acetate, in the presence of at least one acid and acid anhydride. Advantageously, such marked cellulosic materials can be solvent spun into staple fibers which may be further utilized in known materials, webs and articles.

14 Claims, 1 Drawing Sheet

METHOD FOR MAKING CELLULOSE ESTERS INCORPORATING NEAR-INFRARED FLUOROPHORES

BACKGROUND

The present invention relates to materials having a fluorescent marker. More particularly, the invention relates to a synthetic polymer having a near infrared fluorophore associated with the polymer. Another aspect of the present invention is a method for incorporating a thermally stable fluorescing marker into cellulose acetate.

The incorporation of an invisible marker into or onto a natural or synthetic material has recently acquired an elevated awareness due to a variety of reasons. Primarily, such markers have found great utility in security measures for documents, such as checks, passports, negotiable instruments, stock certificates and the like, and labels for pharmaceuticals, health care and cosmetics. Markers have also been incorporated into fibers and threads for woven, nonwoven and knitted materials, as well as being placed on a garment as a means for verifying its authenticity. For example, in the clothing industry, the prevention of counterfeited articles is necessary to protect profitability, assure the customer of the quality of the goods sold, and protect the brand name and loyalty of the customer. The marking of authentic articles is only one means used to achieve these, as well as other, goals of the producer.

Use of fluorescent agents for the tracing and identification of articles such as monitoring the integrity of the yarn or fiber during slashing, warping or weaving is described in U.S. Pat. No. 4,992,204. The patent discloses tagging a material with a luminophore that is cross-linked with at least one poly(oxyalkylene). The tagging compound has an absorbance within the range of about 300 nm to 400 nm.

U.S. Pat. No. 4,504,084 issued to Miehe et al. on Nov. 12, 1991 discloses a method for marking originals so that copies can be distinguished from the originals. The method includes using a ribbon having a printing medium for printing the original. The ribbon includes a substance in the form of a marking which, when used, produces an invisible distinguishable marking which is recognizable only by using a special scanner.

Fluorescing markers have also been used in the petroleum and plastics industry as a means for identifying the material and/or separating marked materials from non-marked materials. For example, U.S. Pat. No. 5,525,516 teaches a method for marking or tagging petroleum products such as diesel fuel, gasoline, and the like with a near infrared fluorescing marker. Such marked petroleum products may then be readily identified.

U.S. Pat. Nos. 5,397,819, 5,553,714 and 5,461,136 teach incorporating a near infrared fluorescing compound into thermoplastic materials. The general concept of tagging various thermoplastic materials with near infrared fluorophores for identification purposes is disclosed in U.S. Pat. No. 5,397,819. This patent relates to a method for marking or tagging a thermoplastic polymeric material using conventional techniques such as those employed to incorporate other additives in similar resins, such as, by admixing, dry or melt blending as powders or pellets, or copolymerizing one or more thermally stable, near infrared fluorescing compounds therein. A wide range of thermoplastic polymers are suitable for blending with the near infrared fluorophore including polyesters such as poly(ethylene terephthalate) and poly(butylene terephthalate); polyolefins such as polypropylene, polyethylene, linear low density polyethylene, polybutylene and copolymers made from ethylene, propylene and butylene; polyamides such as nylon 6 and nylon 66; polycarbonates; cellulose esters such as cellulose acetate, propionate, butyrate, or mixed ester; polyacrylates such as poly(methyl methacrylate); polyimides; polyester-amides; polystyrene; ABS (acrylonitrile-butadine-styrene) type polymers, and thermoplastic oligomers, and the like.

When the near infrared fluorophore is melt blended into the polymer, these operations are conducted at temperatures in excess of 200° C., frequently in excess of 250° C. At such high temperatures, the near infrared fluorophores are readily blended in the molten polymer melt during preparation or processing or just prior to molding or spinning into a fiber and remain in the polymer as true a true blend after processing.

However, it has been discovered that the thermally stable near infrared fluorophores used for this purpose do not readily associate with cellulose esters under the mild conditions required for processing these materials. Most cellulose esters are relatively thermally unstable, requiring them to be processed at temperatures below about 200° C. Under these relatively mild process conditions, the near infrared fluorophores do not dissolve or disperse in the material, nor do the near infrared fluorophores dissolve or disperse into the ordinary plasticizers or solvents used in manufacturing cellulosic esters. The result can be dispersed pockets of fluorescing compounds. These undistributed compounds can further adversely affect the properties of the thermoplastic or articles made from them. Consequently, it has not been possible heretofore to feasibly and acceptably incorporate these thermally stable near infrared fluorophores in cellulosic esters.

Accordingly, there is a need for a cellulosic ester having at least one near infrared fluorophore associated with the thermoplastic. There is also a need for a method of associating a thermally stable near infrared fluorophore with a cellulosic ester.

SUMMARY OF THE INVENTION

Broadly, the present invention relates to a cellulosic ester having at least one near infrared fluorophore associated with the cellulosic ester. Also provided is a method for incorporating the near infrared fluorophore into the cellulosic ester by providing a paste comprising a near infrared fluorophore admixed into a sufficient amount of an acid catalyst system suitable for esterification of the cellulose, and adding the paste to a portion of the cellulose esterification catalyst system.

It is an object of the invention to provide a cellulosic ester having a near infrared fluorophore associated with the ester.

It is another object of the invention to provide a method for preparing a cellulosic ester containing a near infrared fluorophore.

It is another object of the invention to provide a method wherein a near infrared fluorophore is incorporated into a cellulosic ester by acid pasting.

Numerous other objects and advantages of the present invention will become readily apparent from the following detailed description of the preferred embodiments and the appended claims.

DETAILED DESCRIPTION OF THE PREFERRED EMBODIMENTS

Figure 1:
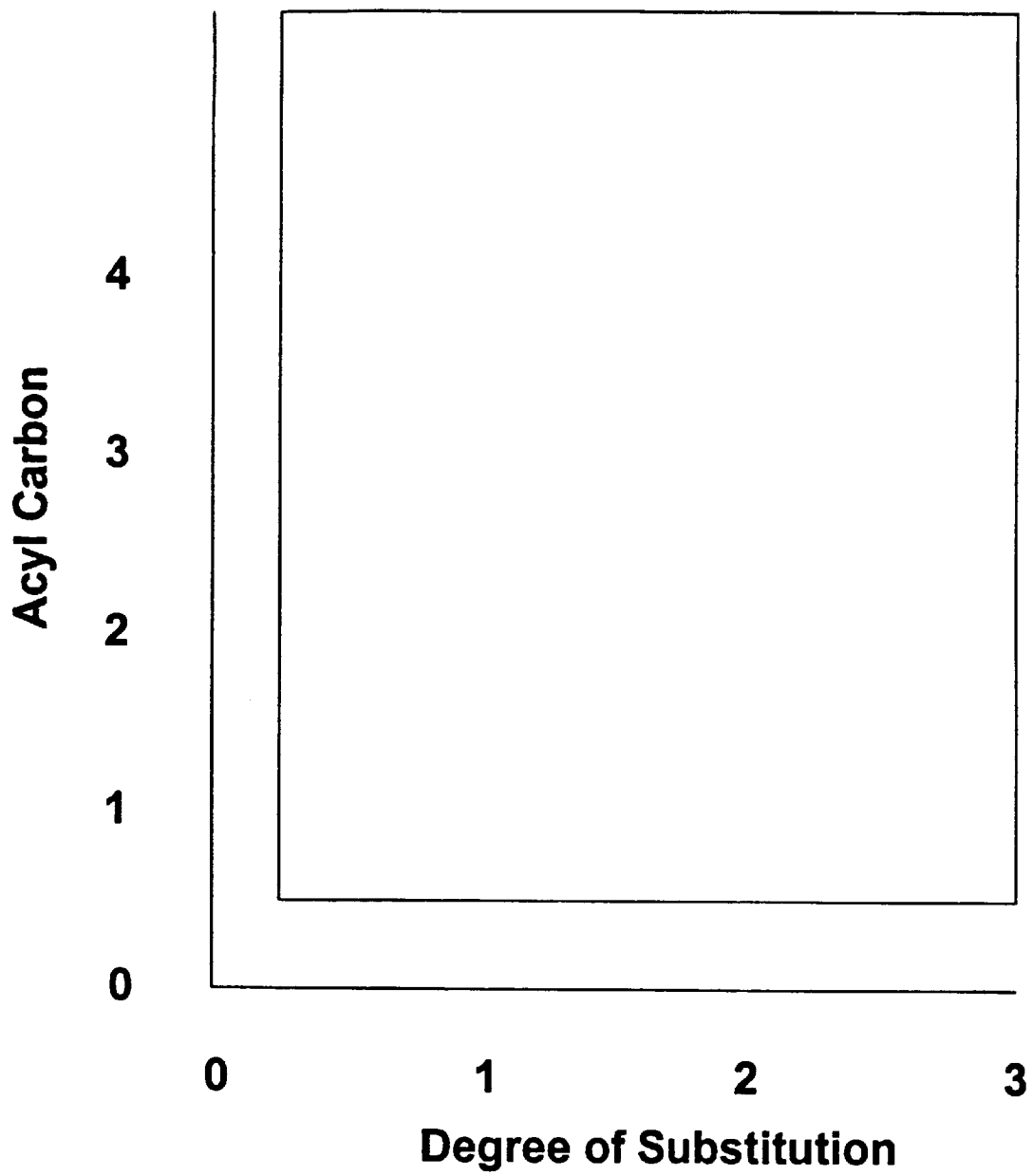
FIG. 1 is a graph illustrating the relationship between the acid used for acylation, the degree of substitution of the OH groups by acyl groups, and the degree of polymerization for the production of a cellulosic ester. As is readily apparent by the area inside of the box, there is a wide range of acyl substitution which may be achieved.

Cellulose acetate is prepared industrially by adding activated cellulose to a strong acid such as sulfuric acid. Activated cellulose acetate may be prepared by using methods well known in the art, such as, by contacting the cellulose acetate with acetic acid, acetic anhydride, propionic anhydride, butyric anhydride, and the like. A description of making activated cellulose acetate is described in greater detail in S. Gedon, R. Fengl, "Organic Cellulose Ester", *Kirk-Othmer Encyclopedia of Chemical Technology*, 5th ed., vol. 5, John Wiley & Sons, Inc., p. 510 et seq., (1993), the disclosure of which is incorporated herein by reference. Suitable sources of cellulose include, but not limited to wood pulp and cotton linters. The cellulose dissolves as it becomes esterified. When esterification is completed, the mixture is treated with aqueous acetic acid and part of the strong acid is neutralized to produce a cellulose dope. The mixture is held for 10 to 12 hours to effect partial hydrolysis of the ester. When the desired degree of hydrolysis of the cellulose ester has been attained, the remaining sulfuric acid is neutralized, the dope is concentrated, filtered, and the cellulose ester is precipitated in dilute acetic acid. Cellulose esters other than the cellulose acetate are made by suitable variations of this procedure.

In one embodiment of the invention a method is provided for associating a near infrared fluorophore with a cellulosic ester. Desirably, the near infrared fluorophore is admixed with the cellulosic ester during preparation of the cellulosic ester. The near infrared fluorophores are incorporated into the cellulosic esters in an amount to produce a detectable fluorescence, using an appropriate detection device, when exposed to electromagnetic radiation having wavelengths of about 670 nm to 2500 nm. The preferred near infrared fluorophore compounds useful in the practice of the invention are selected from the classes of phthalocyanines, naphthalocyanines and squaraines corresponding to the Formulae I, II and III:

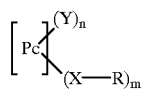

(I)

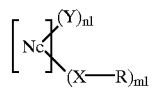

(II)

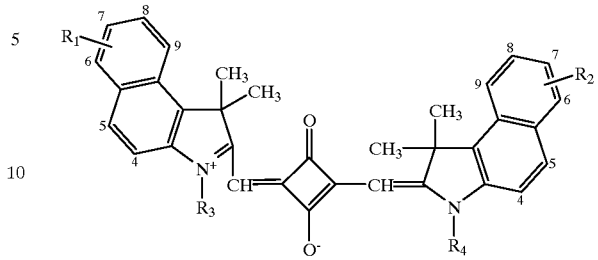

(III)

wherein Pc and Nc represent the phthalocyanine and naphthalocyanine moieties of Formulae Ia and IIa,

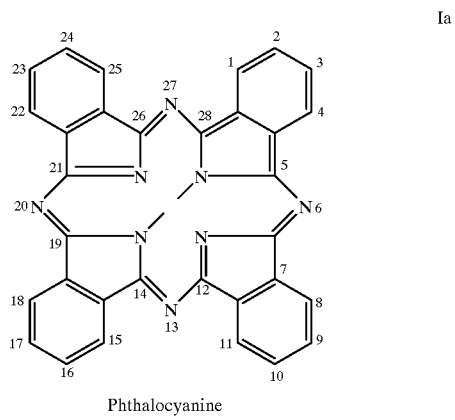

Phthalocyanine (Ia)

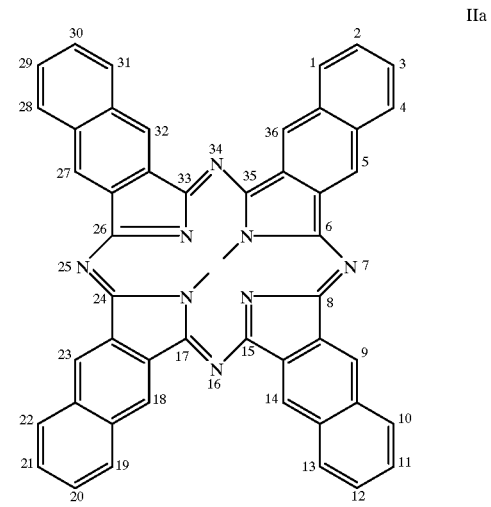

2,3-Naphthalocyanine (IIa)

respectively, covalently bonded to hydrogen or to various metals, halometals, organometallic groups, and oxymetals including AlCl, AlBr, AlF, AlOH, $AlOR_5$, $AlSR_5$, Ca, Ge, $Ge(OR_6)$, Ga, InCl, Mg, Pb, $SiCl_2$, $SiF_2$, $SnCl_2$, $Sn(OR_6)_2$, $Si(OR_6)_2$, $Sn(SR_6)_2$, $Si(SR_6)_2$, TiO or Zn, wherein $R_5$ and $R_6$ are selected from hydrogen, allyl, aryl, heteroaryl, lower alkanoyl, trifluoroacetyl, groups of the formulae:

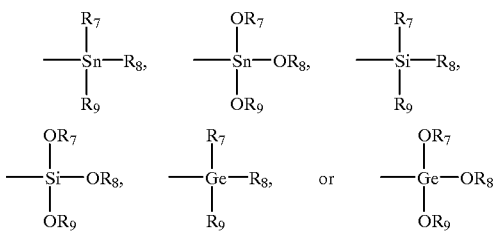

where $R_7$, $R_8$ and $R_9$ are independently selected from alkyl, phenyl or phenyl substituted with lower alkyl, lower alkoxy or halogen.

X is selected from oxygen, sulfur, seleniumn tellurium or a group of the formula $N(R_{10})$, where in $R_{10}$ is hydrogen, cycloalkyl, acyl, alylsulfonyl, or aryl or $R_{10}$ and R taken together form an aliphatic or aromatic ring with the nitrogen atom to which they are attached.

Y is selected from alkyl, halogen or hydrogen.

R is selected from unsubstituted or substituted alkyl, alkenyl, alkynyl, $C_3-C_8$ cycloalkyl, aryl, heteroaryl,

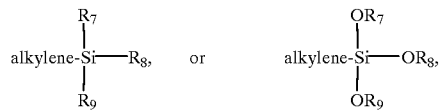

(X—R) moiety can also be alkylsulfonylamino, arylsulfonylamino, or a group selected from the formulae $-X(C_2H_4O)_zR^1$,

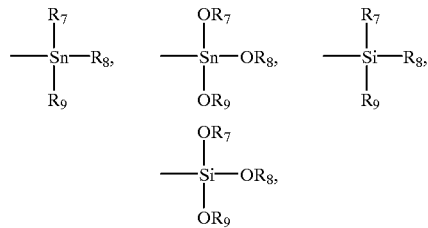

wherein $R^1$ is hydrogen or R as defined above; z is an integer of from 1–4.

Further two (X—R) moieties can be taken together to form divalent substituents of the formula:

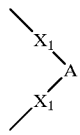

wherein each $X_1$ is independently selected from —O—, —S—, or —N($R_{10}$) and A is selected from ethylene; propylene; trimethylene; and such groups substituted with $C_1-C_4$ alkyl, $C_1-C_4$ alkoxy, aryl and cycloalkyl; 1,2-phenylene and 1,2-phenylene containing 1–3 substituents selected from $C_1-C_4$ alkyl, $C_1-C_4$ alkoxy or halogen.

$R_1$ and $R_2$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

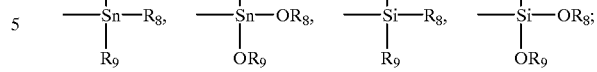

$R_3$ and $R_4$ are independently selected from hydrogen, lower alkyl, alkenyl or aryl; n and m can be an integer from 0–16, and $n_1$ and $m_1$ can be an integer from 0–24 provided that the sums of n+m and $n_1+m_1$ are 16 and 24, respectively. It is to be understood that when n, m, $n_1$ and $m_1$ is 0 the respective moiety is absent In a preferred embodiment of this aspect of the present invention m is from 4 to 12; $m_1$ is from 0–8; provided that in the definitions of the substituents (Y)n, (Y)$n_1$ and (X—R) $m_1$ that these substituents are not present when n, $n_1$ and $m_1$ are zero, respectively. Substituents (X—R) and (Y) are present in compounds Ia on the peripheral carbon atoms, i.e., in positions 1, 2, 3, 4, 8, 9, 10, 11, 15, 16, 17, 18, 22, 23, 24, 25 and substituents (X—R) and (Y) are present on the peripheral carbon atoms of IIa, i.e., in positions 1, 2, 3, 4, 5, 9, 10, 11, 12, 13, 14, 18, 19, 20, 21, 22, 23, 27, 28, 29, 30, 31, 32 and 36.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkanoyl and lower alkanoyloxy the alkyl portion of the groups contains 1–6 carbons and may contain a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, $C_1-C_4$-alkoxy, aryl, $C_1-C_4$-alkylthio, arylthio, aryloxy, $C_1-C_4$-alkoxycarbonyl or $C_1-C_4$-alkanoyloxy.

The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono or bi-cyclic hetero aromatic radicals containing at least one "hetero" atom selected from oxygen, sulfur and nitrogen or a combination of these atoms. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure IV and mixed isomers thereof,

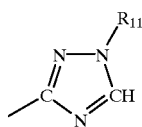

IV wherein $R_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon—carbon double bond and one carbon—carbon triple bond, respectively.

The term halogen is used to include bromine, chlorine, fluorine and iodine.

The term "substituted alkyl" is used to denote a straight or branched chain hydrocarbon radical containing 1–12 carbon atoms and containing as substituents 1 or 2 groups selected from hydroxy, halogen, carboxy, cyano, $C_1$–$C_4$ alkoxy, aryl, $C_1$–$C_4$ alkylthio, arylthio, aryloxy, $C_1$–$C_4$ alkoxycarbonyl, or $C_1$–$C_4$ alkanoyloxy.

The term "substituted carbamoyl" is used to denote a radical having the formula —$CONR_{12}R_{13}$, wherein $R_{12}$ and $R_{13}$ are selected from unsubstituted or substituted alkyl, alkenyl, alkynyl, cycloalkyl, aryl, or heteroaryl.

The term "substituted sulfamoyl" is used to denote a radical having the formula —$SO_2NR_{12}R_{13}$, wherein $R_{12}$ and $R_{13}$ are as defined above.

The term "alkylene" refers to a divalent $C_1$–$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula $R°C$(O)—O—, wherein $R°$ is preferably a $C_1$–$C_{10}$ alkyl moiety. The term "alkyl sulfonyl" refers to a group of the formula $R°SO_2$—, wherein $R°$ is as defined for acyl.

Greater detail as to these near infrared fluorophore compounds and methods for making the compounds are described in the commonly assigned patent, U.S. Pat. No. 5,461,136.

Ideally, for the practice of the invention the near infrared fluorophore compounds used to mark or tag the cellulosic ester should have excellent thermal stability and little light absorption in the visible region, i.e., about 400 nm to 700 nm range. Desirably, they should impart little or no color to the cellulosic ester. Also, the near infrared fluorophore should have strong absorption of near infrared light and have strong fluorescence in the near infrared wave lengths of about 670 nm to 2500 nm. Suitable stability to sunlight and fluorescent light and low extractability or sublimation from the cellulosic ester are also preferred.

The near infrared fluorophore incorporated into the cellulosic ester provides a highly effective tag or marker for identification purposes. Since most polymers themselves absorb UV light, and if they are colored also absorb visible light marking or tagging compounds based on fluorescent UV and/or visible light are not practical. However, interference from the thermoplastics themselves or from typical additives present therein or from typical contamination present is minimal in the near infrared region of the electromagnetic spectrum. Due to the low concentration of the near infrared fluorophore used, the near infrared fluorophore marker or tag may be detected in complex matrix of the thermoplastic while being invisible to the unaided human eye.

In the method of the invention, the near infrared fluorophore is acid pasted into the cellulosic ester. A general description of acid pasting appears in W. Carr in T. C. Patton, Ed., Pigment Handbook, Vol. III, John Wiley, N.Y., p.30, the disclosure of which is incorporated herein by reference. The near infrared fluorophore is dissolved in a strong acid that is compatible or which may further be utilized in the esterification of the cellulose material. The dissolved fluorophore is then precipitated in a very fine particle form by rapid dilution of the strong acid to form an acid paste of the near infrared fluorophore. The paste is added to an activated cellulose in the presence of the cellulose catalyst system having at least one acid and acid anhydride.

In another aspect of the invention, the acid paste containing the near infrared fluorophore is added, with sufficient agitation, to a solution having the cellulosic ester dissolved in a suitable solvent, such as acetone, acetic acid, propionic acid, methylene chloride and mixtures thereof. The cellulosic ester may then be precipitated or spun into a fiber to produce a cellulosic ester having a near infrared fluorophore associated with the cellulosic ester.

Suitable strong acids for carrying out the acid pasting include sulfuric acid, glacial acetic acid and mixtures thereof, with sulfuric acid being preferred. The acid paste may also be diluted with one or more organic acids used for the esterification of the cellulose.

Desirably, the near infrared fluorophore in the paste has a particle size less than about 50 microns, preferably less than about 30 microns, more preferably from about 0.1 microns to about 25 microns and most preferably from about 0.5 microns to about 10 microns. The amount of near infrared fluorophore compound dissolved in the strong acid is dependent upon the amount of marker which is to be incorporated into the cellulose ester. The amount of invisible marker which is incorporated into the cellulose ester will vary depending upon the particular near infrared fluorophore used. One limitation is that the concentration of the near infrared fluorophore in the final material must be high enough to enable the fluorescence to be readily and easily detected. Another parameter on the upper limit of the near infrared fluorophore concentration is determined by economics, since the markers are relatively expensive.

Another consideration is the visible color imparted to the cellulosic ester which may be inherent in the various markers. It is generally desired that the concentration of the near infrared fluorophore be low enough that it does not impart significant visible color to the finished article, or does not change the visual appearance of a colored object which contains the near infrared fluorophore.

Accordingly, it is desirable that the near infrared fluorophore be present at the lowest practical level needed to produce a satisfactory detectable fluorescence to avoid or minimize any color problems resulting from the presence of the fluorophore in the cellulosic ester and to minimize costs. Desirably, the level of near infrared fluorophore present in the cellulosic ester ranges from about 0.1 ppm to about 10% by weight Preferably, the level of near infrared fluorophore present in the cellulosic ester is from about 0.5 ppm to about 1% by weight. More preferably, the cellulosic ester has from about 0.5 ppm to about 100 ppm of the near infrared fluorophore associated therewith and from about 1 ppm to about 10 ppm being most preferred.

It is also within the scope of the invention to prepare a concentrate, or "master batch", of the cellulose ester which contains a relatively high concentration of the near infrared fluorophore. This concentrate is blended, using conventional techniques such as dry mixing, melt blending or solution mixing, with virgin material to give a desired final concentration of the near infrared fluorophore in the final product. Accordingly, the cellulosic ester containing the near infrared fluorophore of the master batch may be dry blended in the form of powders with the other cellulosic ester being in the form of powder or pellets. The dry blend may further contain an adhesion promoter or a dispersing agent. This premix can thereafter be processed using an extruder or molding machine. Other conventional additives, such as, plasticizers, antioxidants, stabilizers, nucleating agents, etc. may also be present in the thermoplastic compositions of the invention.

It is also within the scope of this invention to blend cellulose ester, and particularly cellulose acetate fibers, which contain the near infrared fluorophore with unmodified cellulose acetate and cellulose fibers in order to make an article, such as paper, with relatively high plastic content, but without an excessively high near infrared fluorophore content.

Cellulose is a linear polymer of anhydroglucose units of the general formula $(C_5H_{10}O_5)_n$, each of which contains three hydroxyl groups which are capable of esterification. The value of n (the "DP") may vary widely from about 1500 to over 6000; for the cellulose used for esterification, n is usually between 1000 and 1500. The process of esterification lowers the DP so that the DP of the ester may be about 30. The properties of the cellulose ester will depend upon: the acid(s) used for acylation, the degree of substitution of the OH groups by acyl groups, and upon the degree of polymerization. The relation between these variables is shown in FIG. 1. The cellulose esters with which the process of this invention are concerned are those which fall within the boarders of the box of FIG. 1. These include, but are not limited to, cellulose acetate (both the so-called "secondary acetate", which is partially hydrolyzed, and cellulose triacetate); cellulose acetate-propionate; cellulose acetate-butyrate; cellulose propionate; cellulose butyrate; cellulose acetate-phthalate; and cellulose acetate-trimellitate; and combinations or mixtures of these. It should be understood furthermore that, as in the case of the acetate, the esterification of the cellulose hydroxyl groups by the other acid moieties may be less than 100%.

A further aspect of the present invention there is provided an cellulosic ester composition having at least 0.1 ppm of a near infrared fluorophore associated with the cellulosic ester. A specific embodiment of the invention is a modified material, e.g., paper, which is made by blending marked or tagged cellulose ester fibers with unmarked or untagged cellulose fibers. Paper so made may be identified in the same way as the cellulose ester plastic itself. In addition, depending upon the relative concentration of the cellulose ester, its properties may be varied from those little different from unmodified paper to those of a thermoplastic film. Such paper which contains the near infrared fluorophores may be used, for example, for labeling pharmaceutical containers for rapid, automatic identification and sorting, or for forming boxes which may be identified and sorted. In the event that such paper is recycled, the percent of recycle material, and its source in the new paper may be determined readily by measurement of the intensity and wavelength of the fluorescence when the new paper is subjected to near infrared radiation.

The marked cellulose ester of the present invention may be distinguished from non-marked cellulose ester by exposing the marked cellulose ester to radiation and detecting the fluorescence given off by the marked cellulose ester. The general principle of the operation and a description of a preferred apparatus which is useful for the identification of the near infrared markers present in the cellulose esters of this invention is described in U.S. Pat. No. 5,397,819. The various components of the apparatus are readily available.

The following examples are given by way if illustration of the invention and are not as a limitation thereof.

EXAMPLE 1

This example illustrates the incorporation of a near infrared fluorophore marker into a solution of cellulose acetate in acetic acid, i.e., a hydrolyzed cellulose acetate "dope" containing 18 weight % cellulose acetate.

A naphthalocyanine near infrared fluorophore marker having an absorbance of 780 nm was prepared in accordance with the teaching of U.S. Pat. No. 5,397,819 the entire disclosure of which is incorporated herein by reference. About 10 grams of the marker was dissolved in 440 grams of 98% sulfuric acid.

Approximately 27 grams of the acid paste solution containing the near infrared fluorophore was diluted with about 27 grams of glacial acetic acid. The acid paste was added to a sufficient amount of an of 18 weight % hydrolyzed cellulose acetate dope to produce a resulting solution containing 8 weight % cellulose acetate solution.

Using this 8 weight % cellulose acetate solution as a "master batch", sufficient amounts were added to predetermined amounts of the 18 weight % hydrolyzed cellulose acetate dope to give marker concentrations of 0, 2, and 20 ppm.

Cellulose acetate flake was precipitated from each dope by pouring the respective dope slowly into a solution made from 800 ml of fresh 100% glacial acetic acid in 2800 ml of water and having constant agitation. The resulting light, fluffy, flake was washed thoroughly with water and centrifuged to remove any water remaining on the surface. The fluorescence of the marker at concentrations of 2 ppm and 20 ppm were readily detected when irradiation with a laser having a wavelength of 780 nm.

EXAMPLE 2

The 20 ppm marked cellulose acetate flake of Example 1 was completely dissolved in acetone, ("acetone dope"), filtered and spun into a 3.3 denier per filament fiber. The filament fiber was cut into ¼ inch staple fibers. Paper hand sheets were prepared from a blend having 2 weight % of the marked staple fibers and 98 weight % wood pulp comprising 50 weight % bleached softwood pulp (available from Prince George) and 50 weight % tropical bleached hardwood (available from Aracruz Ecucalyptus). The sheet produced a fluorescence when exposed to an excitation radiation from a 780 nm laser detection system.

EXAMPLE 3

An amount of the acetone dope of Example 2 was mixed with an amount of an acetone dope from an unmarked cellulose acetate described in Example 1 to give a 2 ppm marker concentration in the final cellulose acetate product. This was spun into 3.3 denier per filament fiber and cut into ¼ inch staple fibers. The fibers produced a fluorescence when exposed to an excitation radiation from a 780 nm laser detection system.

One skilled in the art will understand that various modifications can be made to the present invention without departing from the teachings hereof. It is to be further understood that the details of the specific embodiments have been described and illustrated to explain the nature of the invention herein and are not intended to limit the claims which define the scope of the invention. Accordingly, changes may be made by those skilled in the art without departing from spirit and scope of the invention as expressed in the appended claims.

We claim:

1. A method for making a cellulosic ester having a near infrared fluorophore associated therewith comprising the steps of:

a. providing an acid paste having a near infrared fluorophore in a strong acid;

b. adding said acid paste to activated cellulose in the presence of at least one acid and acid anhydride; and c. precipitating said cellulosic ester having said near infrared fluorophore associated therewith.

2. The method of claim 1 wherein said near infrared fluorophore is selected from the group consisting of phthalocyanines, naphthalocyanines and squaraines corresponding to Formulae I, II and III:

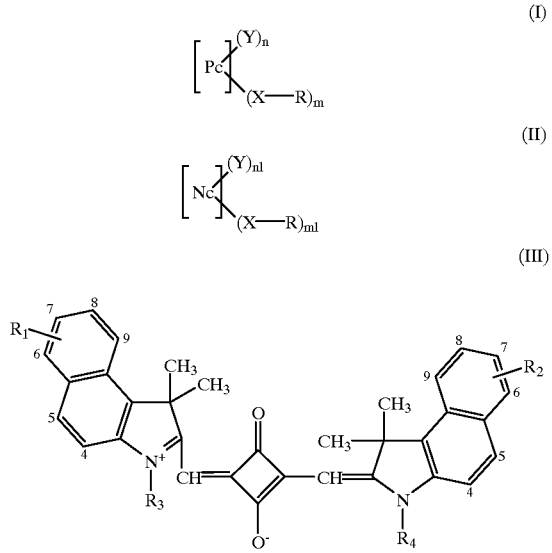

wherein Pc and Nc represent the phthalocyanine and naphthalocyanine moieties of Formulae Ia and IIa,

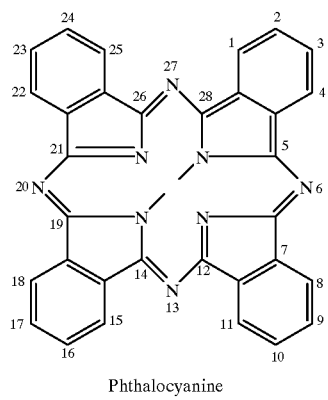

Phthalocyanine

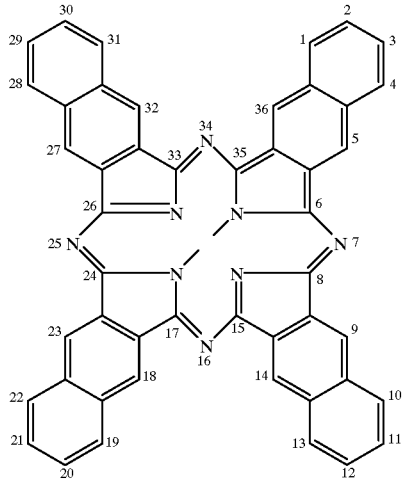

2,3-Naphthalocyanine respectively, covalently bonded to hydrogen or metals selected from the group consisting of AlCl, AlBr, AlF, AlOH, AlOR$_5$, AlSR$_5$, Ca, Co, CrF, Cu, Fe, Ge, Ge(OR$_6$), Ga, InCl, Mg, Mn, Ni, Pb, Pt, Pd, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn, TiO, VO and Zn, wherein R$_5$ and R$_6$ are selected from the group consisting of hydrogen, alkyl, aryl, heteroaryl, lower alkanoyl, trifluoroacetyl, and groups of the formulae:

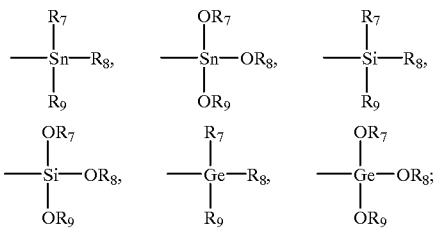

R$_7$, R$_8$ and R$_9$ are independently selected from alkyl, phenyl, phenyl substituted with lower alkyl, phenyl substituted with lower alkoxy or halogen;

X is selected from oxygen, sulfur, selenium, tellurium or a group of the formula —N(R$_{10}$)—, wherein R$_{10}$ is selected from hydrogen, cycloalkyl, alkyl, acyl, lower alkylsulfonyl, or aryl or R$_{10}$ and R taken together form an aliphatic or aromatic ring with the nitrogen atom to which they are attached;

Y is selected from alkyl, aryl, halogen or hydrogen;

R is selected from alkyl, alkenyl, alkynyl, cycloalkyl, aryl, heteroaryl,

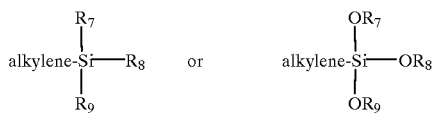

(X—R) can also be selected from alkylsulfonylamino, arylsulfonylamino, or a group selected from the formulae —X(C$_2$H$_4$O)$_z$R',

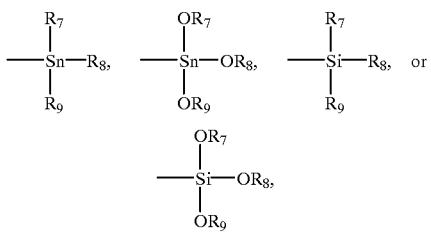

wherein R' is selected from hydrogen or R as defined above; z is an integer of from 1–4; or two (X—R) groups can be taken together to form divalent substituents of the formula

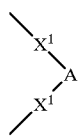

wherein each $X^1$ is independently selected from —O—, —S—, or —N($R_{10}$)— and A is selected from the group consisting of ethylene; propylene; trimethylene; and such groups substituted with $C_1$–$C_4$ alkyl, $C_1$–$C_4$ alkoxy, aryl and cycloalkyl; 1,2-phenylene and 1,2-phenylene containing 1–3 substituents selected from $C_1$–$C_4$ alkyl, $C_1$–$C_4$ alkoxy or halogen;

$R_1$ and $R_2$ are independently selected from the group consisting of hydrogen, lower alkyl, lower alkoxy, halogen, aryloxy, lower alkylthio, arylthio, lower alkylsulfonyl; arylsulfonyl; lower alkylsulfonylamino, lower alkanoylamino, arylsulfonylamino, cycloalkylsulfonylamino, carboxy, unsubstituted and substituted carbamoyl and sulfamoyl, lower alkoxycarbonyl, hydroxy, lower alkanoyloxy,

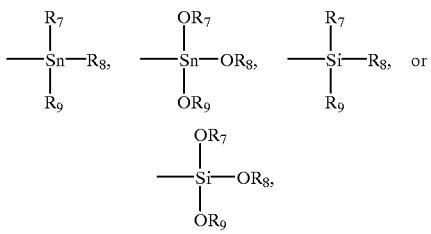

$R_3$ and $R_4$ are independently selected from hydrogen, lower alkyl, alkenyl or aryl; n is an integer from 0–16; $n_1$ is an integer from 0–24, m is an integer from 0–16; $m_1$ is an integer from 0–24; provided the sums of n+m and $n_1+m_1$ are 16 and 24, respectively.

3. The method of claim 1 wherein said strong acid is selected from sulfuric acid, glacial acetic acid and mixtures thereof.

4. The method of claim 1 wherein making said acid paste with said near infrared fluorophore includes the steps of dissolving said near infrared fluorophore in said strong acid and re-precipitating said near infrared fluorophore.

5. The method of claim 1 wherein said cellulosic ester is selected from the group consisting of cellulose acetate, cellulose triacetate, cellulose acetate-propionate, cellulose acetate-butyrate, cellulose propionate, cellulose butyrate, cellulose acetate-phthalate, cellulose acetate-trimellitate, and mixtures thereof.

6. The method of claim 1 wherein said cellulosic ester has from about 0.1 ppm to about 10 weight % of said near infrared fluorophore associated therewith.

7. The method of claim 1 wherein said cellulosic ester has from about 0.5 ppm to about 1 weight % of said near infrared fluorophore associated therewith.

8. The method of claim 1 wherein said cellulosic ester has from about 0.5 ppm to about 100 ppm of said near infrared fluorophore associated therewith.

9. The method of claim 1 wherein said cellulosic ester has from about 1 ppm to about 10 ppm of said near infrared fluorophore associated therewith.

10. The method of claim 1 wherein said near infrared fluorophore in said acid paste has a particle size less than about 50 microns.

11. The method of claim 1 wherein said near infrared fluorophore in said acid paste has a particle size less than about 30 microns.

12. The method of claim 1 wherein said near infrared fluorophore in said acid paste has a particle size of from about 0.1 microns to about 25 microns.

13. The method of claim 1 wherein said near infrared fluorophore in said acid paste has a particle size of from about 0.5 microns to about 10 microns.

14. The method of claim 1 wherein said activated cellulose is dissolved in a solvent selected from the group consisting of acetone, acetic acid, propionic acid, methylene chloride and mixtures thereof.

* * * * *